United States Patent
Saunders

(10) Patent No.: US 6,388,781 B1
(45) Date of Patent: May 14, 2002

(54) APPARATUS FOR TIME DIVISION/WAVE DIVISION CONVERSION

(75) Inventor: Ross Alexander Saunders, Columbia, SC (US)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/199,479

(22) Filed: Nov. 25, 1998

(51) Int. Cl.[7] ............................................. H04J 14/00
(52) U.S. Cl. ...................... 359/123; 359/134; 359/138
(58) Field of Search ................... 359/123, 134, 359/138

(56) References Cited

U.S. PATENT DOCUMENTS

| | | | | |
|---|---|---|---|---|
| 5,737,106 A | * | 4/1998 | Sansonetti | 359/140 |
| 5,953,138 A | * | 9/1999 | Ellis | 359/123 |
| 5,953,142 A | * | 9/1999 | Chiaroni et al. | 359/127 |
| 6,023,360 A | * | 2/2000 | Morioka et al. | 359/123 |
| 6,204,944 B1 | * | 3/2001 | Uchiyama et al. | 359/123 |

OTHER PUBLICATIONS

Lacey, J.P.R. et al. "All–optical WDM to TDM transmultiplexer." Sep. 15, 1994. Electronics Letters, vol. 30, No. 19, pp. 1612–1613.*
Summerfield, M.A. et al. "All–optical TDM to WDM conversion in a semiconductor optical amplifier." Feb. 3, 1994. Electronics Letters, vol. 30, No. 3, pp. 255–256.*

* cited by examiner

Primary Examiner—Leslie Pascal
Assistant Examiner—Christina Y Leung
(74) Attorney, Agent, or Firm—Foley & Lardner

(57) ABSTRACT

A multiplexer demultiplexer for conversion of optical data between a serial bit stream having a bit rate in excess of that of conventional photodetection devices and multiple bit streams at a bit rate that may be serviced using conventional photodetection devices. A wavelength conversion element uses four-wave mixing to produce from a single high rate data stream multiple intermodulation products that together represent the input serial data stream in wavelength division multiplexed (WDM) form. A related device multiplexes multiple WDM data streams provided at conventional bit rates to a serial bit stream having a bit rate in excess of that of conventional photodetection devices.

3 Claims, 4 Drawing Sheets

US 6,388,781 B1

APPARATUS FOR TIME DIVISION/WAVE DIVISION CONVERSION

FIELD OF THE INVENTION

The invention pertains to the field of multiplexing and demultiplexing optical signals between the time and wavelength domains. The invention addresses the problem of enabling the use of optical fiber data transmission at rates that exceed the maximum bit rate of conventional photodetectors.

BACKGROUND OF THE INVENTION

Optical fiber data transmission is widely employed because of its high bandwidth and low cost of operation. Optical fibers are presently capable of carrying data at bit rates in excess of 100 Gb/s. However, the maximum practical rate of data transmission over optical fibers is limited by the maximum bit rate of conventional photodetectors and the associated electronic components used to convert the optical signals to electrical signals. To support a bit rate of 100 Gb/s, a photodetector would need an operating frequency of approximately 50 Ghz. This rate is far in excess of what is available in conventional devices. Accordingly, optical fiber data transmission using conventional devices and methods is currently limited to time division multiplexed (TDM) data rates of approximately 10 Gb/s.

SUMMARY OF THE INVENTION

It is an object of the invention to provide a multiplexer for demultiplexing optical data from a serial bit stream having a bit rate in excess of that of conventional photodetection devices to multiple bit streams at a bit rate that may be serviced using conventional photodetection devices. This object of the invention is accomplished, in general terms, through the use of four-wave mixing in a wavelength conversion element to produce from a single high rate data stream multiple intermodulation products which together represent the input data stream in wavelength division multiplexed (WDM) form.

A preferred embodiment of the invention in accordance with this object is an apparatus for converting a time division multiplexed signal to multiple wave division multiplexed signals. The apparatus includes a clocked pump for producing clocked signals having unique wavelengths at successive intervals corresponding to the bit rate of an input return-to-zero TDM signal. A wavelength conversion element produces intermodulation products of the TDM signal and clocked signals that represent a logical AND of the clocked signals and the TDM signal.

It is a further object of the invention to provide a multiplexer for multiplexing multiple data streams provided at conventional bit rates to a serial bit stream having a bit rate in excess of that of conventional photodetection devices. This object of the invention is accomplished, in general terms, through the use of four-wave mixing in a wavelength conversion element to produce from multiple data streams at differing wavelengths a single high rate data stream which represents the input data streams in time division multiplexed (TDM) form.

A preferred embodiment of the invention in accordance with this object is an apparatus for converting multiple wave division multiplexed (WDM) signals to a time division multiplexed (TDM) signal. The apparatus includes a clocked pump for producing clocked signals having unique wavelengths at successive intervals corresponding to the bit rate of an input WDM signal divided by the number of clocked signal. A wavelength conversion element produces intermodulation products of the WDM signal and clocked signals that represent a logical AND of the clocked signals and the WDM signal.

DESCRIPTION OF DRAWINGS

The invention will be further understood through reference to the accompanying drawings, in which.

DETAILED DESCRIPTION OF THE INVENTION AND ITS PREFERRED EMBODIMENTS

As discussed above, the invention involves an application of four wave mixing. Four wave mixing is a manifestation of a third-order optical nonlinearity in which the polarization of the medium is a function of the cube of an applied electric field. As a result, first and second frequencies phase modulate one another via the fiber nonlinearity, producing an oscillation in the index of refraction at the difference frequency of the first and second frequencies. This oscillation in turn produces further intermodulation products which are conventionally regarded as a source of noise and hence a limiting factor in the selection of wavelengths in WDM transmissions. In the present invention, however, four-wave mixing is employed advantageously to produce, from the combination of a TDM data stream and a clocked pump having multiple predetermined wavelengths, intermodulation products which represent the TDM data stream as a WDM data stream.

Figure 1:
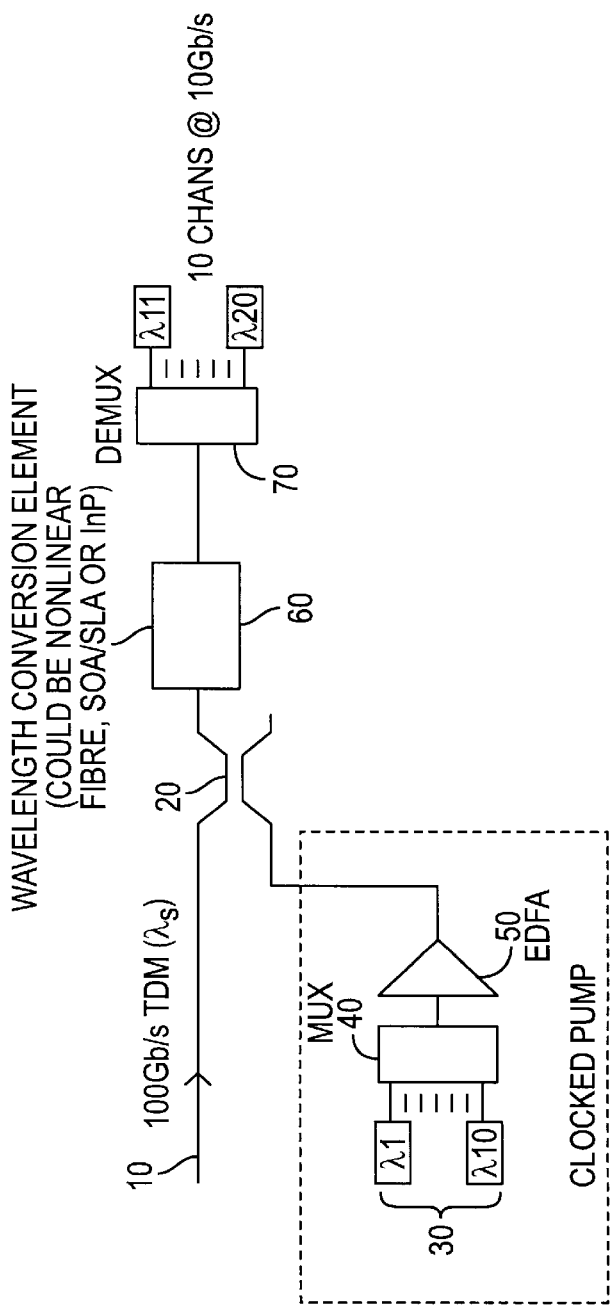
FIG. 1 shows an exemplary device for TDM to WDM conversion in accordance with the invention.
Figure 3:
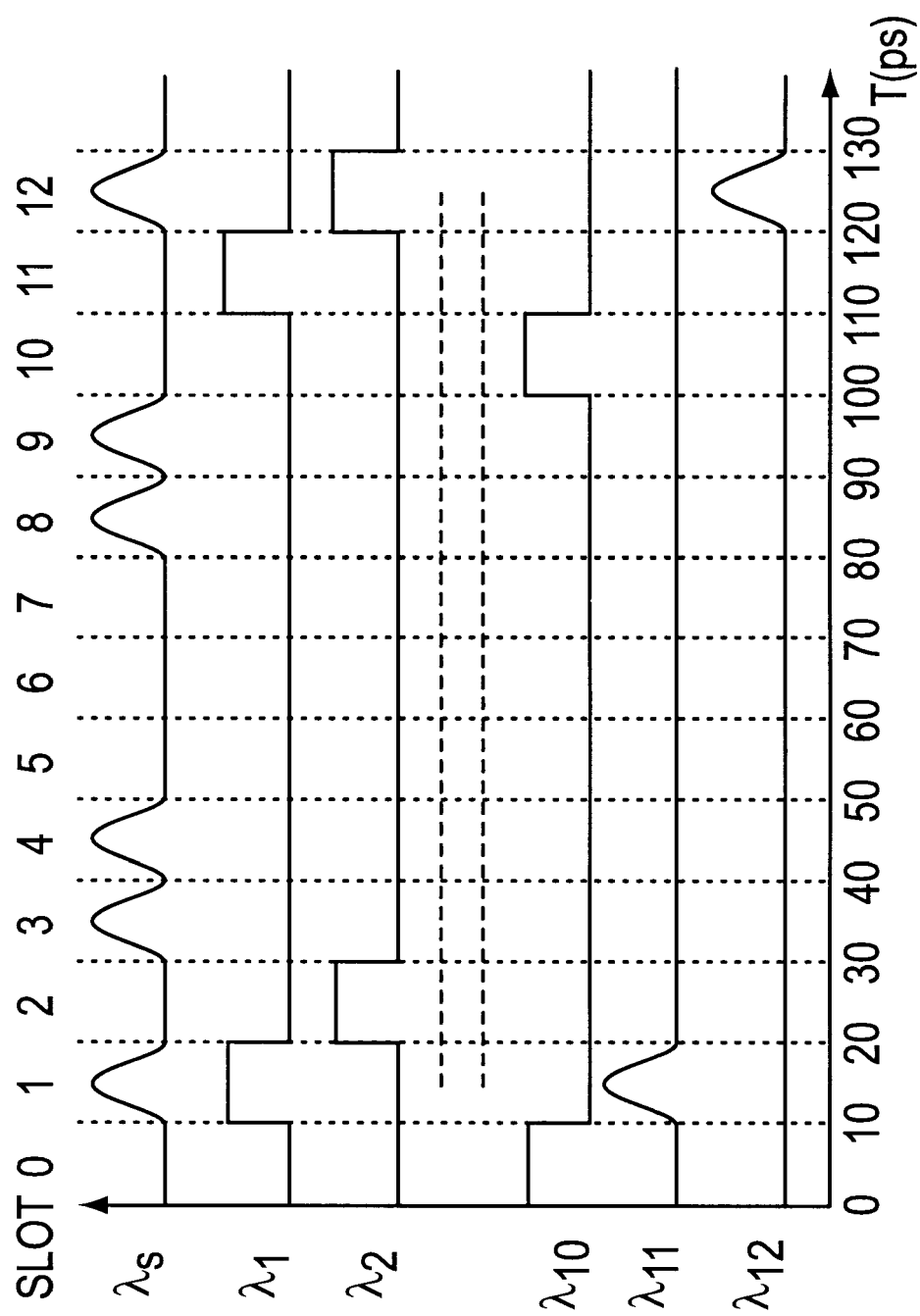
FIG. 3 shows a timing diagram of signals in the device of FIG. 1.

Reference is now made to FIG. 1, which illustrates a first embodiment of the invention. The purpose of the first embodiment of the invention is to convert a TDM data stream to multiple WDM data streams. As seen in FIG. 1, a return-to-zero TDM data stream having a wavelength $\lambda_S$ is received on an optical fiber 10. The TDM data stream is input to an optical coupler 20. Also input to the optical coupler is a WDM data stream. The WDM data stream is produced by a clocked wavelength pump comprising a plurality of wavelength generators 30 each having a unique wavelength. The wavelength generators may comprise, for example, mode-locked lasers. The wavelength generators are clocked such that each wavelength generator is sequentially activated. Sequential activation of the wavelength generators occurs at the bit rate of the TDM signal, and each wavelength generator remains activated for a period greater than the incoming TDM pulse width, but less than the TDM bit period. The timing relationship between the TDM signal and wavelength generator signals is illustrated in FIG. 3. While ten wavelength generators are shown in the illustrated embodiment, it will be appreciated that the number of wavelength generators employed will vary with the bit rate of the TDM data stream and the specified demultiplexed channel rate.

The outputs of the wavelength generators 30 are provided to a multiplexer 40 which multiplexes the pump wavelengths in the wavelength domain. The multiplexed output data stream may be amplified by an amplifier 50 before being provided to the optical coupler 20.

Figure 2:
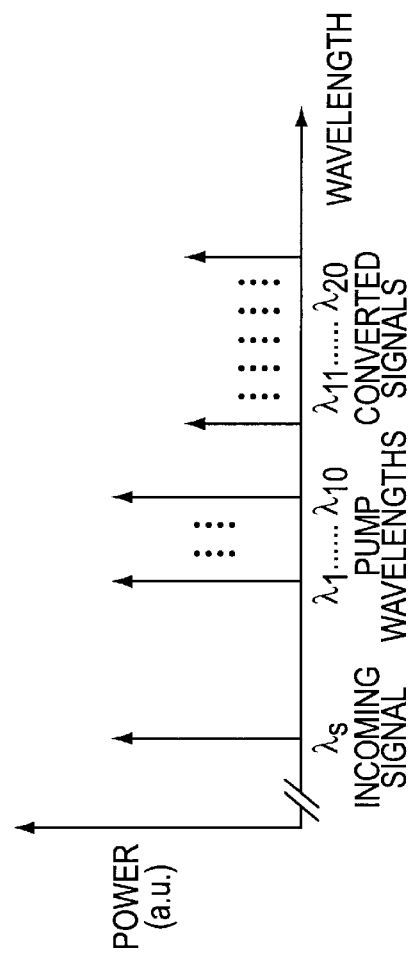
FIG. 2 shows a spectral diagram of signals in the device of FIG. 1.

The output of the optical coupler is provided to a wavelength conversion element 60. The wavelength conversion element is a Kerr medium such as a high nonlinearity fiber, for example, InP, or a semiconductor optical amplifier. Through the phenomena of four wave mixing, an output of the wavelength conversion element includes intermodulation products having respective wavelengths $\lambda_{11\text{-}20}$. The output of the wavelength conversion element therefore represents the data of the first TDM data stream as WDM data, with each of the respective intermodulation products representing a logical AND between a bit of the TDM signal and the corresponding bit of the clocked WDM pump signals. It may be seen in FIG. 2 that the wavelengths of the intermodulation products, and hence the converted signals which they yield, are longer than those of the first TDM signal and the wavelength generators. Of course, since four wave mixing is a symmetrical phenomenon, the pump and intermodulation product wavelengths may alternatively be shorter than that of the TDM signal.

A demultiplexer 70 converts the output signal of the wavelength conversion element to yield independent WDM signals. These signals together represent the data of the first TDM signal, but at a bit rate which is equal to the bit rate of the first TDM signal divided by the number of clocked pump wavelengths. Accordingly, and TDM signal having a bit rate of 100 Gb/s may, as shown in FIG. 1, be converted to multiple signals each having a bit rate of 10 Gb/s.

Figure 4:
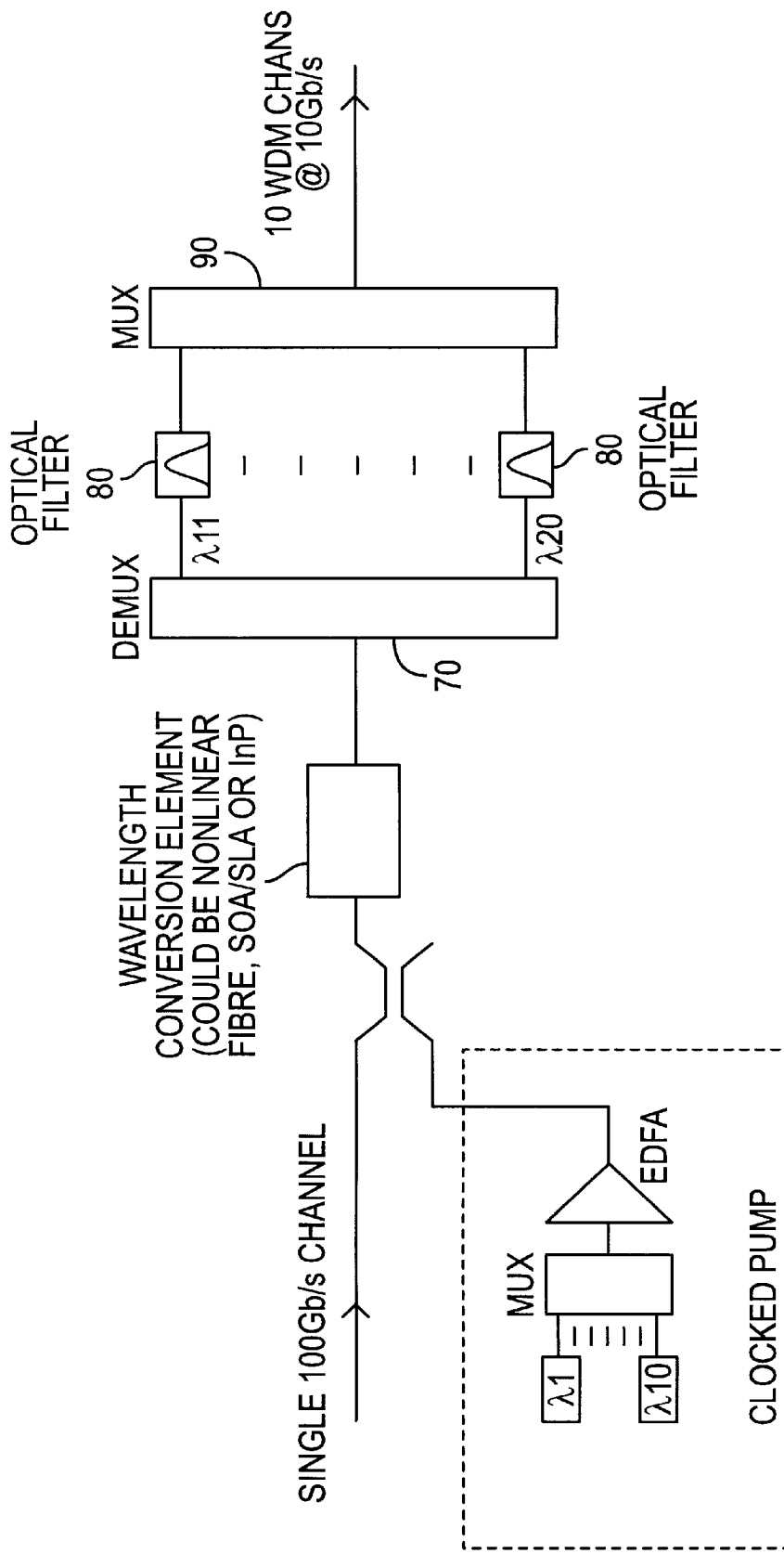
FIG. 4 shows an enhanced embodiment of the exemplary device of FIG. 1.

A preferred embodiment of the invention for longer dispersion-limited system reach over a WDM network is illustrated in FIG. 4. As shown in FIG. 4, the respective output wavelengths from the demultiplexer are passed through respective optical filters 80 which are tuned to the wavelength of the corresponding demodulation products. Filtering reduces the optical bandwidth of the signals and expands the pulse widths of the signals. A multiplexer 90 then multiplexes the filtered and expanded signals to yield a WDM signal that represents the first TDM signal.

The first embodiment of the invention would be used, for example, in a high speed TDM receiver. Similarly, the first embodiment of the invention may be used in gateway device which maps a single high speed TDM line to multiple lower speed WDM lines. In both of these applications it will be appreciated that the use of the first embodiment of the invention allows high speed TDM data to be reduced in speed by a factor equal to the number of clocked wavelengths produced by the clocked pump. The individual bit rate of each TDM signal may thereby be reduced to a rate which is appropriate for the available optoelectronics.

Figure 5:
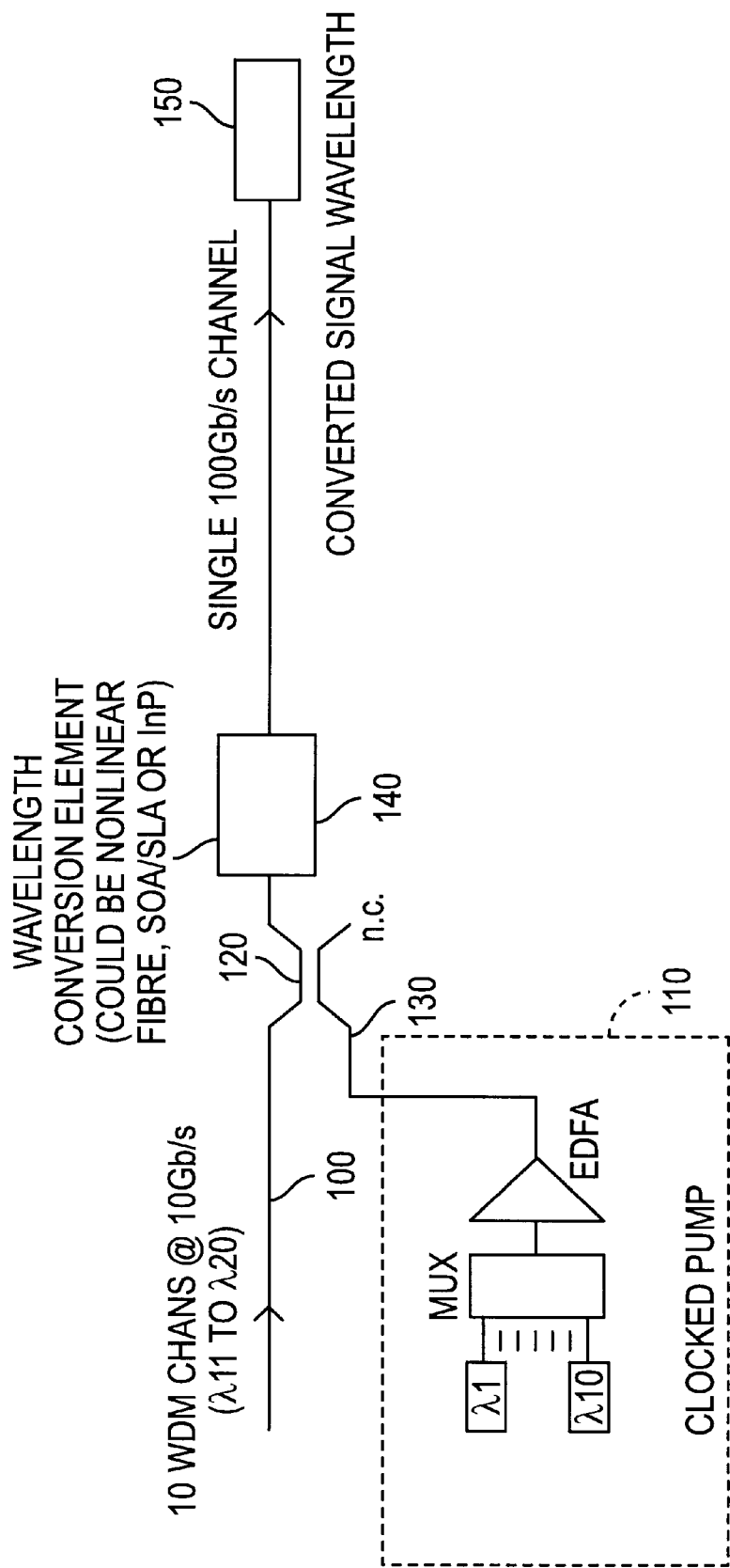
FIG. 5 shows an exemplary device for WDM to TDM conversion in accordance with the invention.

Reference is now made to FIG. 5, which illustrates a second embodiment of the invention. The purpose of the second embodiment of the invention is to convert multiple WDM data streams to a single TDM data stream having a bit rate equal to the number of incoming WDM channels times the WDM channel bit rate. The second embodiment therefore essentially reverses the process performed in the first embodiment. As seen in FIG. 5, a first input channel 100 of an optical coupler 120 carries WDM channels having receptive wavelengths $\lambda_{11\text{-}20}$. A clocked pump 110 provides a TDM signal comprising successive wavelengths $\lambda_{1\text{-}10}$ generated by wavelength generators of the clocked pump. The output of the clocked pump is provided to a second input channel 130 of the optical coupler 130. The output signal of the optical coupler is provided to a wavelength conversion element 140 as discussed with regard to the first embodiment. Through the four wave mixing phenomena as discussed above, an intermodulation product is produced which represents the data of the WDM channels as a single TDM signal. The output of the wavelength conversion element may be filtered to eliminate the WDM and clocked pump wavelengths from the signal. Filter 150 is shown in FIG. 5.

For purposes of providing a correct TDM signal, the signal from each wavelength generator of the clocked pump must have an appropriate shape and width to produce the necessary intermodulation product (i.e. TDM data stream component). The accuracy on the wavelengts of the pumps must be closely controlled because if the converted pulses have slightly different frequencies, this will translate into timing jitter, due to the fiber Group Velocity Dispersion (GVD). For example, for a 500 km system with 0.05 ps/nm.km GVD and a jitter limit of +/−0.5 ps, the required optical frequency accuracy should be within +/−20 MHz.

While the devices described above are preferred embodiments of the invention, the scope of the invention includes the various alternative embodiments that will be apparent to the person of ordinary skill in the art in view of the teachings provided herein. The scope of the invention may be apprehended from consideration of the appended claims in view of the teachings provided herein.

What is claimed is:

1. An apparatus for converting multiple wave division multiplexed (WDM) signals to a time division multiplexed (TDM) signal, comprising:

a clocked pump for producing clocked signals having unique wavelengths at successive intervals corresponding to the bit rate of an input WDM signal divided by the number of clocked signals, the clocked pump comprising a plurality of wavelength generators for generating output signals at respective unique wavelengths; and a wavelength conversion element for producing intermodulation products of the WDM signal and clocked signals that represent a logical AND of the clocked signals and the WDM signal.

2. The apparatus claimed in claim 1, further comprising an optical filter for filtering the WDM signal and clocked signals from the output of the wavelength conversion element.

3. The apparatus claimed in claim 1, wherein the clocked pump further comprises a multiplexer for multiplexing the output signals of the wavelength generators in the wavelength domain.

* * * * *